T. D. SHAW.
Churn.

No. 61,268.  Patented Jan. 15, 1867.

Witnesses:  Inventor:
Thomas D. Shaw

United States Patent Office.

THOMAS D. SHAW, OF WESTFIELD, OHIO.

Letters Patent No. 61,268, dated January 15, 1867.

---

IMPROVEMENT IN CHURNS.

---

The Schedule referred to in these Letters Patent and making part of the same.

---

TO ALL WHOM IT MAY CONCERN:

Be it known that I, THOMAS D. SHAW, of Westfield, in the county of Medina, and State of Ohio, have invented certain new and useful Improvements in Churns; and I do hereby declare that the following is a full and complete description of the construction and operation of the same, reference being had to the accompanying drawings, making a part of this specification, in which—

Figure 1:
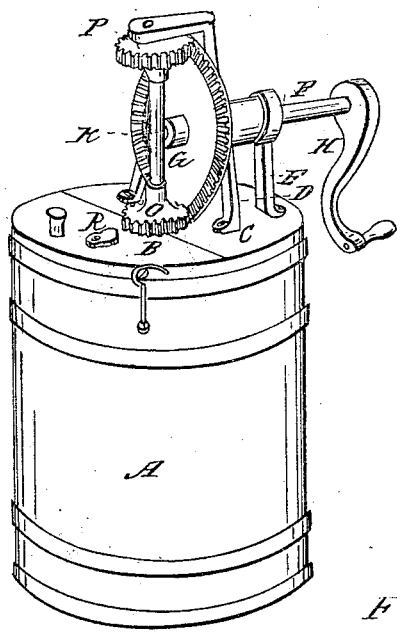
Figure 2:
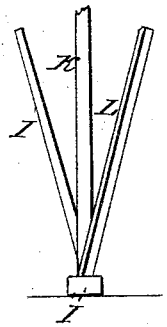
Figure 3:
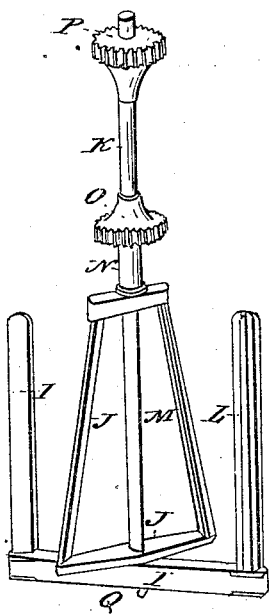

Figure 1 is a perspective view of the churn.
Figure 2 is a detached section of the dasher.
Figure 3 is the dasher detached.

Like letters of reference refer to like parts in the views.

A, the body of this churn, is constructed of wood, or it may be of stoneware, if so desired, and of any capacity needed. The cover of this churn is divided in two sections, B and C. To the section C is secured the machinery by the means of which the dashers are agitated. This machinery consists of the standards D and E, in which is fitted the shaft F. To the inner end of this shaft is keyed the large bevel-wheel G, and to the outer, the crank H. The dasher consists of a pair of rectangular arms, I J, fig. 3. The arm J revolves within the arm I, and in reverse direction, as will be hereafter shown. The arms I are fastened to the shaft K near the bottom, and by the means of which they are turned, whereas the arms J are free upon the shaft, and upon which they revolve, and may be slid upward and downward, for a purpose hereafter referred to. It will be observed that the arms are not vertical nor parallel to each other, but that they incline from each other in opposite directions, as shown in fig. 2. L and M, fig. 3, are tubes attached to and running the length of the arm, to which they are fixed. Both ends of the tubes are open, and are constructed alike and of equal capacity. N is a sleeve, the lower end of which is connected to the inner dasher J, and to the upper end is keyed the small bevel-wheel O, by the means of which the dasher is operated. To the upper end of shaft K is keyed the bevel-wheel P, which in turn operates the dasher I, both of which are operated conjointly in the manner as follows: The shaft K is placed in the churn, in the bottom of which is a step for the reception of the point Q, and upon which the shaft turns. The small bevels are then placed in relation to the large bevel G, and by the means of which the two are driven, and as a consequence in opposite directions, and thereby causes the dashers to revolve also in opposite directions to each other. By this reverse double action of the dashers the cream becomes thoroughly agitated through the entire mass, and the globule thereby quickly broken, and the churning speedily accomplished. To assist in this particular operation, a current of air is admitted to the cream from or near the bottom by means of the tubes referred to; also air is admitted to the cream through the air-hole R in the cover. In having the dasher J so arranged as to slide upon the shaft, offers greater convenience for cleaning, as it can be moved up out of the way, and that part of the shaft enclosed by the sleeve can be washed, and all the particles of cream or butter that may have found its way into the sleeve or about the shaft can be entirely removed; thus every part of the churn becomes accessible, and can therefore be easily handled and left clean.

What I claim as my improvement, and desire to secure by Letters Patent, is—

The dashers I and J, provided with tubes L M, in combination with the sleeve N, shaft K, and operating conjointly by the gearings O, P, and G, as and for the purpose set forth.

THOMAS D. SHAW.

Witnesses:
W. H. BURRIDGE,
J. HOLMES.